United States Patent
Seto

(12) 
(10) Patent No.: US 6,661,116 B1
(45) Date of Patent: Dec. 9, 2003

(54) BATTERY SWITCHING DEVICE AND EMERGENCY ALERTING SYSTEM COMPRISING THIS

(75) Inventor: Hitoshi Seto, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 10/009,569

(22) PCT Filed: Apr. 20, 2000

(86) PCT No.: PCT/JP00/02599

§ 371 (c)(1),
(2), (4) Date: Dec. 12, 2001

(87) PCT Pub. No.: WO01/81120

PCT Pub. Date: Nov. 1, 2001

(51) Int. Cl.[7] .............................. H02G 3/00; G05F 1/56
(52) U.S. Cl. ...................................... 307/10.1; 323/281
(58) Field of Search .......................... 307/10.1, 64, 66, 307/85, 86, 130, 150; 320/104, 116, 124; 323/281; 123/198, 479, 630; 340/426, 428, 439, 635, 636, 933

(56) References Cited

U.S. PATENT DOCUMENTS 5,204,610 A * 4/1993 Pierson et al. .............. 320/126

FOREIGN PATENT DOCUMENTS

| DE | 3908324 | * | 9/1990 |
| JP | 5-68306 | | 3/1993 |
| JP | 5-49519 | | 6/1993 |

* cited by examiner

*Primary Examiner*—Pia Tibbits
(74) *Attorney, Agent, or Firm*—Sughrue Mion, PLLC

(57) ABSTRACT

Unnecessary consumption of power of an auxiliary primary battery 2, and other problems have been inherent in a conventional battery system. Such problems have occurred because of frequent switching from a main battery to the auxiliary primary battery 2 when power is supplied from the main battery loaded on a vehicle to emergency call devices 6 and 7. According to the present invention, a novel battery switching device is disclosed, capable of executing automatic switching at a voltage for making operable the emergency radio signal generation circuit 6 of an emergency call device, and executing switching based on the starting signal of a manual switch 17 or an air bag at a higher voltage.

12 Claims, 6 Drawing Sheets

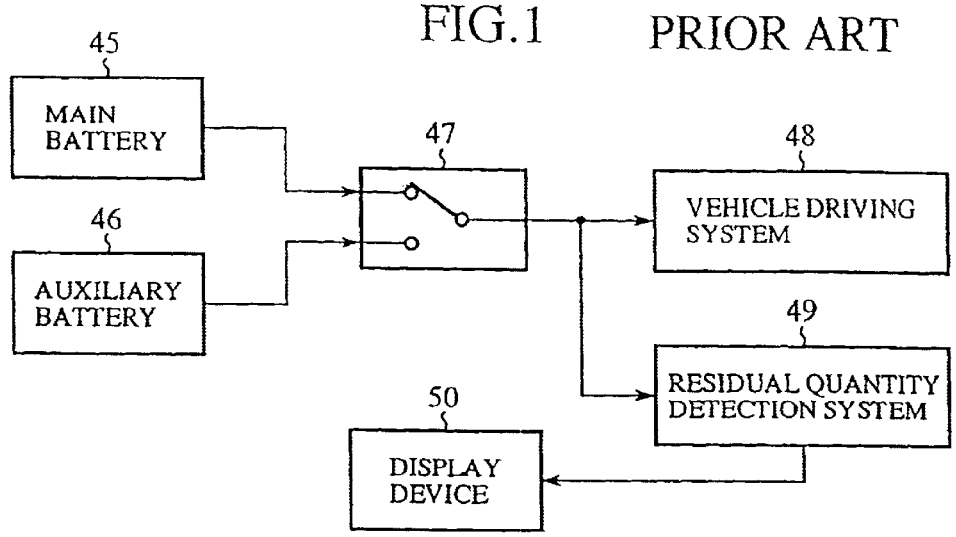
FIG.1 PRIOR ART
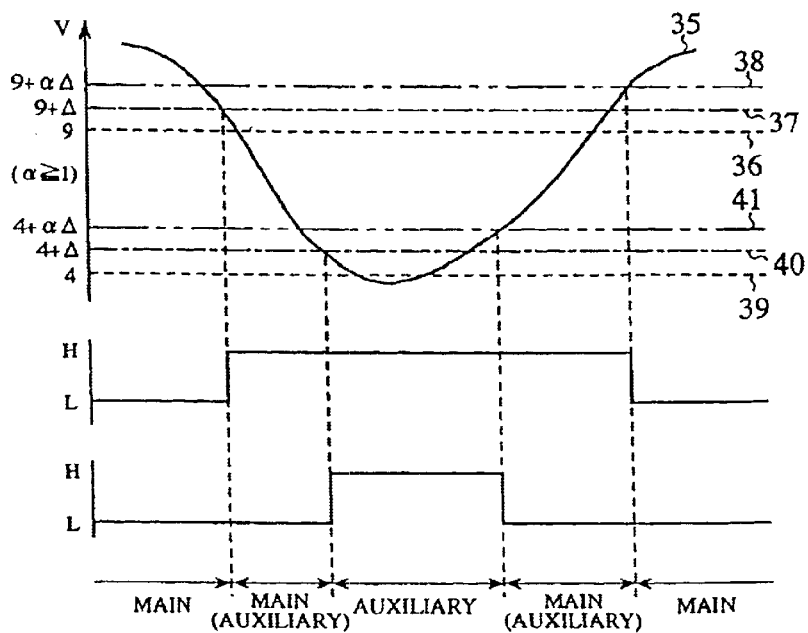

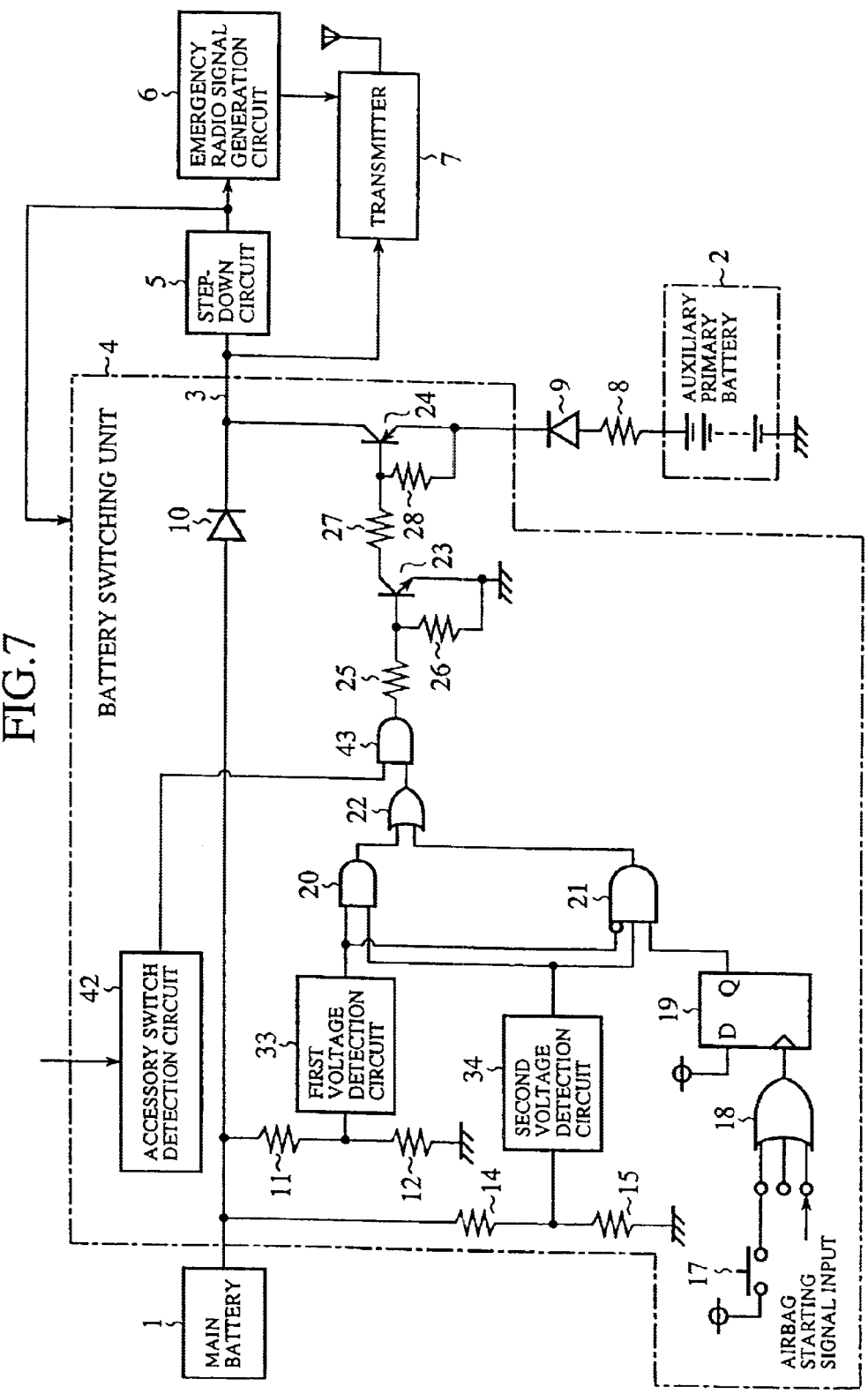

BATTERY SWITCHING DEVICE AND EMERGENCY ALERTING SYSTEM COMPRISING THIS

TECHNICAL FIELD

This invention relates to a battery switching device loaded on a vehicle such as an automobile to transmit an emergency radio signal in case of emergency, and an emergency call system using the same. More specifically, the invention relates to an improvement to enable the emergency radio signal to be transmitted by switching the main battery of the vehicle to an auxiliary primary battery.

BACKGROUND ART

FIG. 1 is a schematic diagram showing the configuration of a conventional battery system loaded on a vehicle such as an automobile. In the drawing, a reference numeral 45 denotes a main battery; 46 an auxiliary battery; 47 a switch for switching the batteries; 48 a vehicle driving system; 49 a residual quantity detection system; and 50 a display device.

Next, the operation of the conventional battery system will be described.

Normally, the switch 47 connects the main battery 45 to the vehicle driving system 48 or the like. The residual quantity detection system 49 detects the voltage of the main battery 45, and the display device 50 displays the voltage value thereof. When the output voltage of the main battery 45 drops down to below a predetermined voltage, the switch 47 connects the auxiliary battery 46 to the vehicle driving system 48 or the like, instead.

As the conventional on vehicle battery system is constructed in the foregoing manner, various inconveniences may occur when power is supplied from this battery system, and an emergency call device for transmitting an emergency radio signal in case of emergency is loaded.

The emergency call device generally comprises an emergency radio signal generation circuit for generating an emergency radio signal, and a transmitter section for transmitting the thus generated emergency radio signal by radio. The emergency radio signal generation circuit is operable if a voltage applied thereto is equal to or higher than a minimum operating voltage required for its operation. The transmitter needs a voltage equal to or higher than a minimum operating voltage required for its operation. Accordingly, when power is supplied to such an emergency signal transmitter by using the conventional battery system, the switch 47 must be set to be switched by a voltage at least equal to/higher than the minimum operating voltage of the transmitter.

In the case of a vehicle such as an automobile, however, an output voltage of the main battery 45 is typically set at 12 V and, since a large quantity of current is consumed, for example at the time of starting an engine, the voltage of the main battery is greatly reduced. Consequently, if a switching voltage of the switch 47 is set at 9 V, then switching may frequently be made from the main battery 45 to the auxiliary battery 46, leading to a wasteful consumption of power of the auxiliary battery 46.

Especially, there has been a problem inherent in the auxiliary battery 46. That is, although a non-chargeable primary battery is used for the auxiliary battery 46, as it can be used in the wide range of temperature, yet realizing low cost, if switching is made too frequently to the auxiliary battery 46, the primary battery must be replaced by another one even if no emergency call devices are used originally, which places a cost burden on an end user.

The present invention was made to solve the foregoing problems, and it is an object of the invention to provide a battery switching device capable of transmitting an emergency radio signal from an emergency signal transmitter by effectively suppressing the wear of an auxiliary primary battery, thereby preventing any cost burdens from being placed on an end user, and making sure switching from a main battery to the auxiliary primary battery in case of emergency. It is another object of the invention to provide an emergency call system using such a battery switching device.

DISCLOSURE OF THE INVENTION

In accordance with the present invention, there is provided a battery switching device, which is loaded on a vehicle and adapted to supply power from a main battery or an auxiliary primary battery of the vehicle to an emergency signal transmitter for transmitting an emergency radio signal. The battery switching device comprises: a first voltage detection circuit for detecting whether or not an output voltage of the main battery is lower than a first detection voltage for making operable an emergency radio signal generation circuit of the emergency signal transmitter; a second voltage detection circuit for detecting whether or not an output voltage of the main battery is lower than a second detection voltage for making operable a transmitter section of the emergency signal transmitter; a manual switch for outputting an operation signal; a trigger generation unit for switching made to output a trigger signal when the operation signal and/or an air bag starting signal is entered; and a switching determination circuit, to which output signals are entered from said first and second voltage detection circuits and said trigger generation unit, wherein said switching determination circuit always switches from the main battery to the auxiliary primary battery when an output voltage of the main battery lower than the first detection voltage, and switches from the main battery to the auxiliary primary battery only when a trigger signal is entered in a case in which an output voltage of the main battery is equal to or larger than the first detection voltage and lower than the second detection voltage.

With the battery switching device thus constructed, no automatic switching is executed from the main battery to the auxiliary primary battery unless the first detection voltage becomes lower than the second detection voltage. Thus, unnecessary switching to the auxiliary primary battery is prevented at the time of starting an engine or the like. It is therefore possible to effectively suppress the wear of the auxiliary primary battery, and to prevent any cost burdens more than necessary on an end user.

Further, when the first detection voltage becomes lower than the second detection voltage, switching is automatically made from the main battery to the auxiliary primary battery. In addition, a voltage lower than the second detection voltage and equal to or higher than the first detection voltage, the main battery is immediately switched to e auxiliary primary battery by operating the manual switch. Therefore, it is possible to transmit an emergency radio signal from the emergency signal transmitter by surely switching from the main batter to the auxiliary primary battery in case of emergency.

According to the battery switching device of the invention, the first voltage detection voltage circuit and/or the second voltage detection circuit determines whether or not an output voltage of the main battery is lower than each detection voltage by using the respective detection voltages, and determines whether or not an output voltage of the main battery is higher than the respective detection voltages by using each releasing voltage higher than the detection voltage.

Thus, compared with the case of using a signal voltage, the use of the detection voltage of the main battery and the releasing voltage prevents frequent switching in the vicinity of the first detection voltage and/or the second detection voltage. It is therefore possible to suppress the wear of the auxiliary primary battery.

According to the battery switching device of the invention, an accessory switch detection circuit is provided for detecting an operation state of an accessory switch of the vehicle. The switching determination circuit executes switching to the auxiliary primary battery only when accessory switch is being operated in the accessory switch detection circuit.

Thus, for example even when the main battery dies due to the lighting of a head light during an engine stop, since no switching is executed to the auxiliary primary battery, it is possible to prevent the wear of the auxiliary primary battery.

In accordance with the invention, there is provided an emergency call system, comprising: a main battery; an auxiliary primary battery; an emergency signal transmitter including an emergency radio signal generation circuit for generating an emergency radio signal, and a transmitter section for transmitting the emergency radio signal by radio; the above-described battery switching device for supplying power from the main battery or the auxiliary primary battery to the emergency signal transmitter; and a third battery for supplying power to the battery switching device.

With the emergency call system thus constructed, even when an output voltage of the main battery drops to lower than the first detection voltage, the battery switching device can be surely operated to switch to the auxiliary primary battery. Moreover, since the battery switching device is operated by the third battery provided separately from the auxiliary primary battery, it is possible to execute the switching without any wear of the auxiliary primary battery.

BRIEF DESCRIPTION OF THE DRAWINGS

FIG. 1 is a schematic diagram showing the configuration of a conventional battery system.

FIGS. 6A to 6C are timing charts, illustrating together operations of first and second voltage detection circuits according to the second embodiment of the invention.

FIG. 7 is a schematic diagram showing the configuration of an emergency call system for automobile according to a third embodiment of the invention.

BEST MODES FOR CARRYING OUT THE INVENTION

Next, the preferred embodiments of the invention will be described in detail with reference to the accompanying drawings.

First Embodiment

Figure 2:
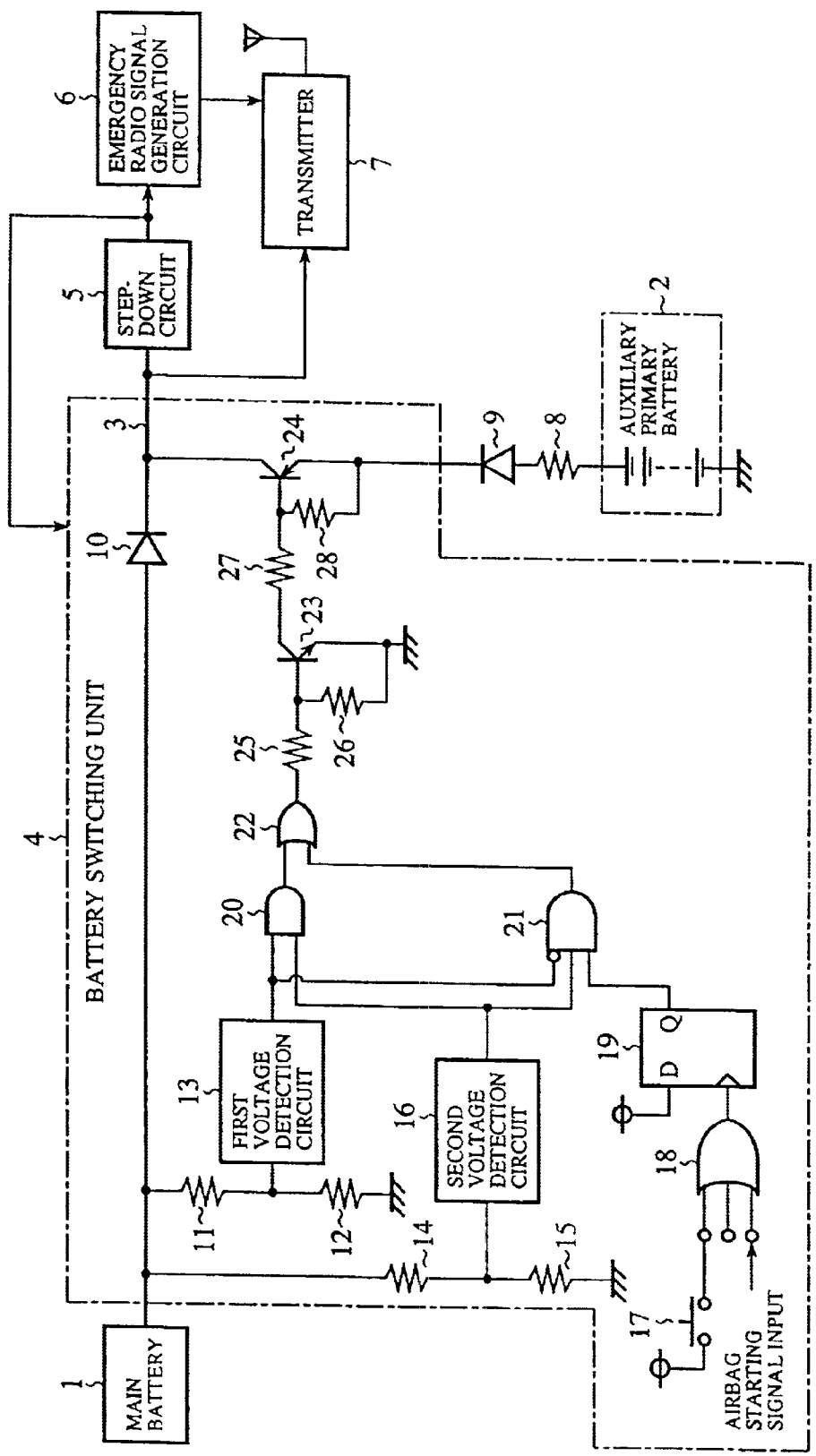
FIG. 2 is a schematic diagram showing the configuration of an emergency call system for automobile according to a first embodiment of the present invention.

FIG. 2 is a schematic diagram showing the configuration of an emergency call system for automobile (vehicle) according to the first embodiment of the invention. In the drawing, a reference numeral 1 denotes an automotive main battery for outputting power of a voltage 12 V; 2 an auxiliary primary battery having six primary batteries connected in series; 3 a power supply line for supplying power to each portion of the vehicle; 4 a battery switching unit (battery switching device) for connecting one selected from the main battery 1 and the auxiliary battery 2 to the power supply line 3; 5 a step-down circuit for converting a voltage of the main battery 1 into a voltage of 5 V; 6 an emergency radio signal generation circuit (emergency call signal transmitter) for generating an emergency radio signal in case of emergency; 7 a transmitter (emergency signal transmitter) having the power supply line 3 directly connected thereto, and adapted to transmit, by radio, an emergency radio signal outputted from the emergency radio signal generation circuit 6; 8 a protective resistor connected to the output of the auxiliary primary battery; and 9 a first reverse-current prevention diode. The battery switching unit 4 also receives the supply of a voltage 5 V outputted from the step-down circuit 5. The battery switching unit 4 and the emergency radio signal generation circuit 6 are operated at a power supply voltage of minimum 4 V (minimum operating voltage), and the transmitter 7 is operated at a power supply voltage of minimum 9 V (minimum operating voltage).

The battery switching unit 4 includes: a second reverse-current prevention diode 10 disposed on the power supply line 3; a pair of first voltage dividing resistors 11 and 12 for dividing the output voltage of the main battery 1 on a power supply path upstream of the second reverse-current prevention diode 10; a first voltage detection circuit 13 for receiving the entry of the divided voltage of the pair of first voltage dividing resistors 11 and 12, and outputting a high-level first detection signal based on the entered voltage when an output voltage of the main battery 1 is equal to/lower than $(4+\Delta)$ V (first detection voltage); a pair of second voltage dividing resistors 14 and 15 for dividing the output voltage of the main battery 1 on the power supply path upstream of the second reverse-current prevention diode 10; a second voltage detection circuit 16 for receiving the entry of the divided voltage of the pair of second voltage dividing resistors 14 and 15, and outputting a high-level second detection signal based on the entered voltage when an output voltage of the main battery 1 is equal to/lower than $(9+\Delta)$ V (second detection voltage); a manual switch 17; a multiple input OR circuit (trigger generation unit) 18 for receiving an output voltage of the manual switch 17 or the entry of an air bag starting signal, which means the starting of an air bag at its high level; and a D flip-flop (trigger generation unit) 19 for outputting a high-level latching signal by using the output of the multiple input OR circuit 18 as a trigger.

The battery switching unit 4 further includes: a 2-input AND circuit (switching determination circuit) 20 for outputting a high-level first switching signal when the first and second detection signals are both at high levels; a 3-input AND circuit (switching determination circuit) 21 for outputting a high-level second switching signal when the first detection signal is at a low level, and the second detection signal and the latching signal are at high levels; a 2-input OR circuit (switching determination circuit) 22 for outputting a high-level switching circuit when either one of the first and second switching signals is at a high level; an npn transistor 23, to the base of which the switching signal is entered, with its emitter grounded; a pnp transistor 24 to the base of which the collector of the npn transistor 23 is connected, while its emitter is connected to the first reverse-current prevention diode 9, and its collector 3 connected to the power supply line; a pair of third voltage dividing resistors 25 and 26 for dividing the output voltage of the 2-input OR circuit 22; and a pair of fourth voltage dividing resistors 27 and 28 for dividing the output voltage of the auxiliary primary voltage 2.

Next, an operation will be described.

After power of a voltage 12 V or higher has been normally outputted from the main battery 1, the first voltage detection circuit 13 outputs a low-level first detection signal, and the second voltage detection circuit 16 outputs a low-level second detection signal. Then, the first switching signal of the 2-input AND circuit 20 becomes low-level, the second switching signal of the 3-input AND circuit 21 becomes low-level, and the switching signal of the 2-input OR circuit 22 also becomes low-level. Accordingly, the npn transistor 23 is set to an OFF state, preventing the flow of current to the pair of fourth voltage dividing resistors 27 and 28, and thus the pnp transistor 24 is also set to an OFF state. As a result, the output voltage of the main battery 1 is supplied to the power supply line, and the step-down circuit 5 converts the thus supplied voltage into a voltage 5 V, and outputs it. The battery switching unit 4, the emergency radio signal generation circuit 6 and the transmitter 7 are then operated based on this output voltage of the main battery 1. When an emergency situation such as an accident, a trouble, burglary or the like occurs in such a state, the emergency radio signal generation circuit 6 generates an emergency radio signal, and the transmitter 7 transmits this emergency radio signal by radio. When the manual switch 17 is operated or an air bag starting signal is entered in this state, the output of the D flip-flop 19 is changed from a low level to a high level, and a high-level latching signal is outputted therefrom. However, the second switching signal of the 3-input AND circuit 21 is maintained at a low level.

When the output voltage of the main battery 1 is reduced, and set equal to/lower than $(9+\Delta)$ V, the second detection signal is changed to a high level. Then, in this state, when the manual switch 17 is operated or an air bag starting signal is entered, a high-level latching signal is outputted from the D flip-flop 19. Accordingly, the second switching signal of the 3-input AND circuit 21 is changed to a high level. Thus, the output (switching signal) of the 2-input OR circuit 22 is also changed to a high level, the npn transistor 23 is changed to an ON state, supplying the current to the pair of fourth voltage dividing resistors 27 and 28, and the pnp transistor 24 is also changed to an ON state. As a result, the output of the auxiliary primary battery 2 is connected to the power supply line 3 and, if the output voltage of the auxiliary primary battery 2 is higher than that of the main battery 1, then instead of the power of the main battery 1, the power of the auxiliary primary battery 2 is supplied to the battery switching unit 4, the emergency radio signal generation circuit 6 and the transmitter 7.

When the output voltage of the main battery 1 is further reduced and set equal to/lower than $(4+\Delta)$ V, the first detection signal is also changed to a high level. As a result, the output (first switching signal) of the 2-input AND circuit 20 is changed to a high level, and the output (switching signal) of the 2-input AND circuit 22 is also changed to a high level. The npn transistor 23 is changed to an ON state, supplying current to the pair of fourth voltage dividing resistors 27 and 28, and the pnp transistor 24 is also changed to an ON state. Thus, the output of the auxiliary primary battery 2 is connected to the power supply line and, if the output voltage of the auxiliary primary battery 2 is higher than that of the main battery 1 at this time, instead of the power of the main battery 1, the power of the auxiliary primary battery 2 is supplied to the battery switching unit 4, the emergency radio signal generation circuit 6 and the transmitter 7. Even when the manual switch 17 is operated or an air bag starting signal is entered to change the second switching signal of the triple AND circuit 21 to a high level, since the output (switching signal) of the 2-input AND circuit 20 has already been set at the high level, no changes occur in the connection state of the auxiliary primary battery 2 to the power supply line 3.

Table 1 is a truth table for explaining the relation between the output voltage of the main battery 1 and the switching operation of the battery switching unit 4. In Table 1, a left end column represents the output voltage of the main battery 1; a second column the level of the first detection signal; a third column the level of the second detection signal; and a right end column the pattern of a power supply source with respect to the power supply line 3. As shown in Table 1, the power of the main battery 1 is always supplied to the power supply line when the output voltage of the main battery 1 is equal to or higher than $(9+\Delta)$ V. The power of the main battery 1 is sup plied to the power supply line 3 if not in case of emergency, when the output voltage of the main battery 1 is lower than $(9+\Delta)$ V and equal to or higher than $(4+\Delta)$ V, whereas when the manual switch 17 is operated or an air bag starting signal is entered, the power of the auxiliary primary battery 1 is supplied to the power supply line 3. Further, the power of the auxiliary primary battery 1 is always supplied to the power supply line 3, when the output voltage of the main battery 1 becomes lower than $(4+\Delta)$ V.

TABLE 1

| Main battery detection voltage | First detection signal | Second detection signal | Switching condition |
|---|---|---|---|
| Equal to/higher than $(9 + \alpha\Delta)$ V (but, $\alpha > = 1$) | L | L | Always main battery is connected |
| Equal to/higher than $(4 + \alpha\Delta)$ V, Less than $(9 + \alpha\Delta)$ V | L | H | Usually main battery is connected, whereas auxiliary battery is connected by output of latching signal |
| Less than $(4 + \alpha\Delta)$ V | H | H | Always auxiliary primary battery is connected |

Figure 3A:
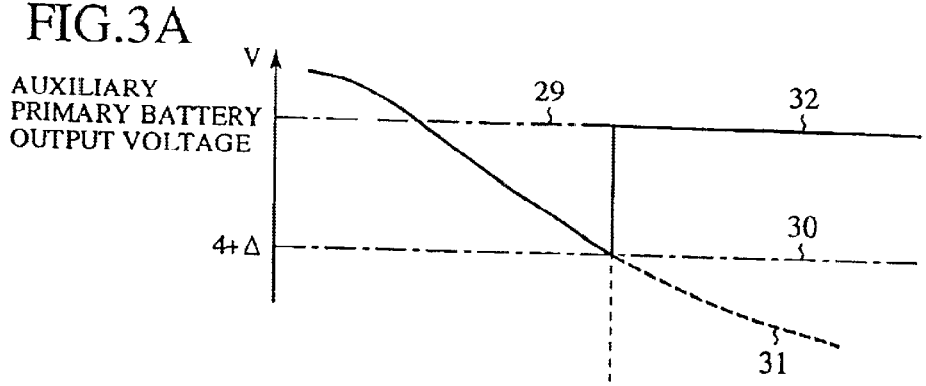
FIGS. 3A to 3C are tiling charts, showing together a switching operation performed at a timing at which an output voltage of a main battery becomes less than 4 V.
Figure 3B:
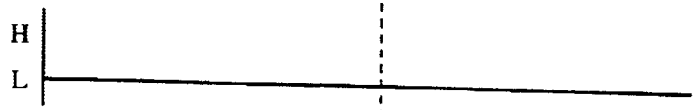
Figure 3C:

FIGS. 3A to 3C are timing charts, showing together a switching operation performed at a timing when the output voltage of the main battery 1 becomes lower than $(4+\Delta)$ V. Specifically, FIG. 3A shows a voltage waveform; FIG. 3B shows the waveform of a latching signal outputted from the D flip-flop 19; and FIG. 3C shows the waveform of a switching signal outputted from the 2-input OR circuit 22. A reference numeral 29 denotes an output voltage of the auxiliary primary battery; 30 a first detection voltage; 31 an output voltage waveform of the main battery 1; and 32 the voltage waveform of the power supply line 3. As shown, a switching signal outputted from the 2-input OR circuit 22 is changed from a low level to a high level at a timing when the output voltage of the main battery 1 becomes lower than a first detection voltage $((4+\Delta)$ V). Accordingly, the output voltage of the auxiliary primary battery 2 is supplied to the power supply line 3.

Figure 4A:
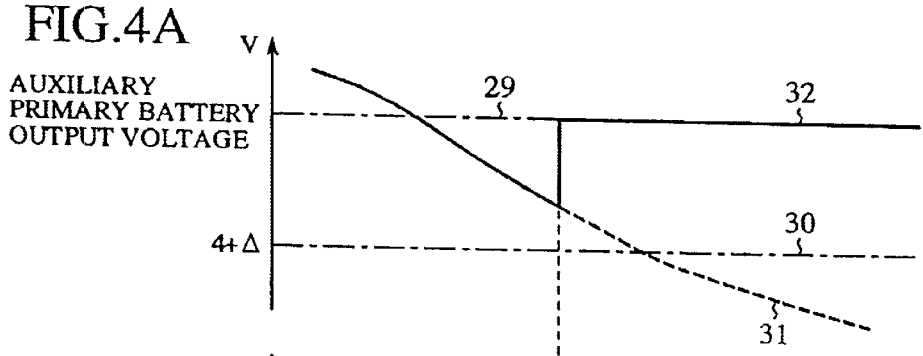
FIGS. 4A to 4C are timing charts, showing together the switching operation performed at a timing at which a manual switch is operated or an air bag starting signal is entered.
Figure 4B:
Figure 4C:

FIGS. 4A to 4C are timing charts, showing together a switching operation at a timing when the manual switch 17 is operated or when an air bag starting signal is entered. The waveforms of FIGS. 4A to 4C are similar to those of FIGS. 3A to 3C. As shown, when a latching signal outputted from the D flip-flop 19 is changed from a low level to a high level, a switching signal outputted from the 2-input OR circuit 22 is also changed from a low level to a high level and, accordingly, the output voltage of the auxiliary primary battery 2 is supplied to the power supply line 3.

As described above, according to the first embodiment no automatic switching is executed from the main battery 1 to the auxiliary primary battery 2 unless $(4+\Delta)$ V, which is a sum of the minimum voltage for making operable the battery switching unit 4 and the value $\Delta$ that is a margin in consideration of switching or the like, which is much lower than $(9+\Delta)$ V is set, thereby preventing the unnecessary switching of the auxiliary primary battery 2 at the time of starting the engine or the like. Therefore, it is possible to effectively suppress the wear of the auxiliary primary battery 2, and to prevent any cost burdens more than necessary on the end user.

Furthermore, after $(4+\Delta)$ V much lower than $(9+\Delta)$ V has been set, switching is automatically executed from the main battery 1 to the auxiliary primary battery 2 and, in the range of $(4+\Delta)$ V to $(9+\Delta)$ V, the main battery 1 is immediately switched to the auxiliary primary battery 2 by operating the manual switch 17 or entering an air bag starting signal. Therefore, in case of emergency, by executing a sure switching from the main battery 1 to the auxiliary primary battery 2, it is possible to transmit an emergency radio signal generated by the emergency radio signal generation circuit 6 from the transmitter 7.

Second Embodiment

Figure 5:
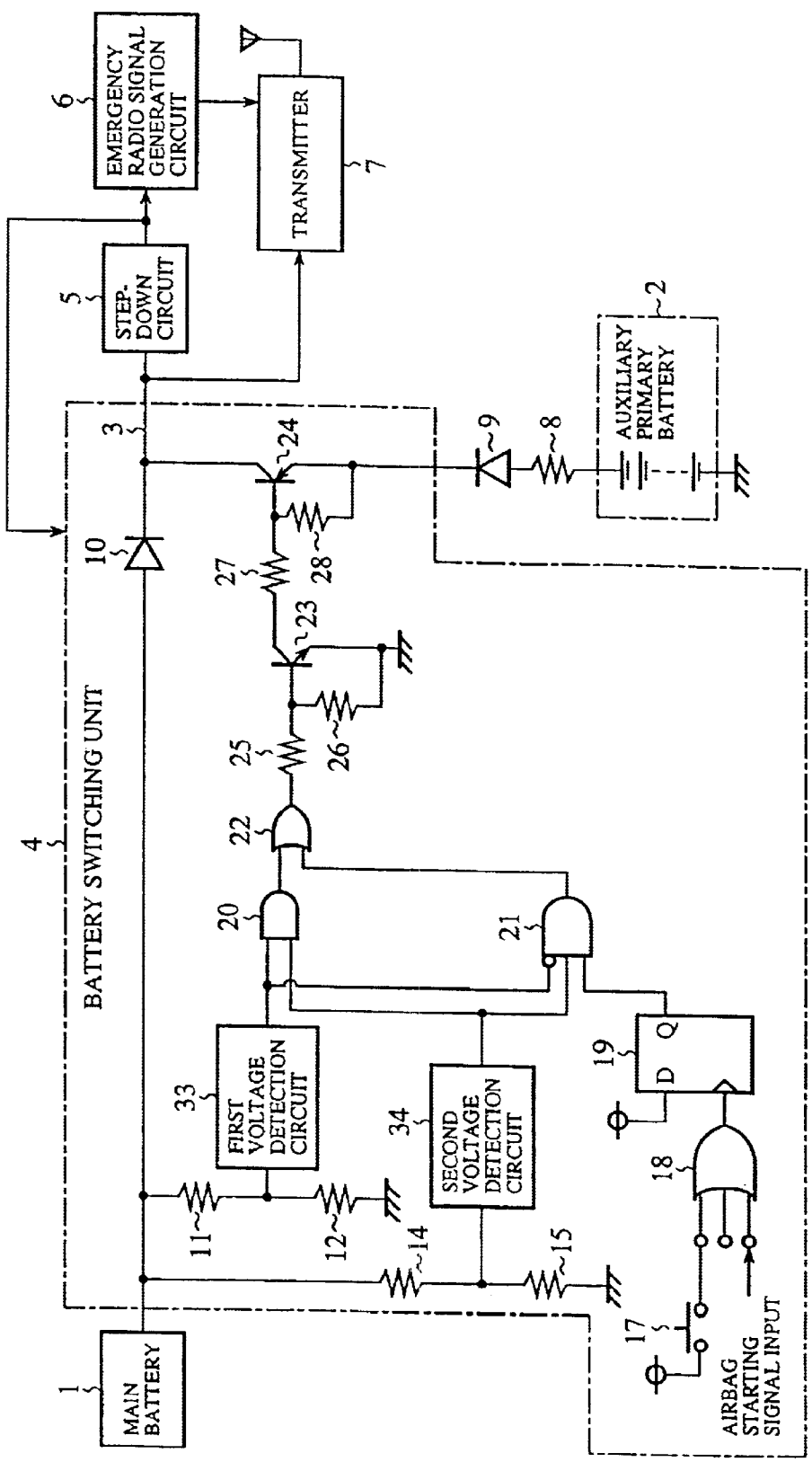
FIG. 5 is a schematic diagram showing the configuration of an emergency call system for automobile according to a second embodiment of the invention.

FIG. 5 is a schematic diagram showing the configuration of an emergency call system for automobile according to the second embodiment of the invention. In the drawing, a reference numeral 33 denotes a first voltage detection circuit for controlling a first detection signal to be high-level based on the divided voltage of the pair of first voltage dividing resistors 11 and 12 when the output voltage of the main battery 1 is reduced to $(4+\Delta)$ V or lower, and controlling the first detection signal to be low-level when the output voltage exceeds $(4+\alpha\Delta)$ V ($\alpha$ is a given value, but $\alpha>=1$); and 34 a second voltage detection circuit for controlling a second detection signal to be high-level based on the divided voltage of the pair of second voltage dividing resistors 14 and 15 when the output voltage of the main battery 1 is reduced to $(9+\Delta)$ V (detection voltage) or lower, and controlling the second detection signal to be low-level when the output voltage exceeds $(9+\alpha\Delta)$ V ($\alpha$ is a given value, but $\alpha>=1$). Other components are similar to those of the first embodiment, and thus description thereof will be omitted.

Next, an operation will be described.

FIGS. 6A to 6C are timing charts, showing together the first and second voltage detection circuits 33 and 34 of the second embodiment of the invention. Specifically, FIG. 6A shows a voltage waveform; FIG. 6B shows the waveform of a second detection signal; and FIG. 6C shows the waveform of a first detection signal. A reference numeral 35 denotes an output voltage waveform of the main battery 1; 36 a minimum operating voltage of the transmitter; 37 a detection voltage of the second voltage detection circuit 34; 38 a releasing voltage of the second voltage detection circuit 34; 39 a minimum operating voltage of the transmitter; 40 a detection voltage of the first voltage detection circuit 33; and 41 the releasing voltage of the first voltage detection circuit 33. A symbol $\Delta$ represents a margin voltage. As shown, the second detection signal is changed to a high level when the output voltage of the main battery 1 becomes lower than $(9+\Delta)$ V, whereas it is changed to a low level when the output voltage of the main battery 1 is set equal to/higher than $(9+\alpha\Delta)$ V. Similarly, the first detection signal is changed to a high level when the output voltage of the main battery 1 becomes lower than $(4+\Delta)$ V, whereas it is changed to a low level when the output voltage of the main battery 1 is set equal to/higher than $(4+\alpha\Delta)$ V. Other operations are similar to those of the first embodiment, and thus description thereof will be omitted.

As described above, according to the second embodiment, a releasing voltage $(4+\alpha\Delta)$ V is set to be higher than a detection voltage $(4+\Delta)$ V in the first voltage detection circuit 33 by a predetermined margin voltage $\Delta V$. Accordingly, even when the output voltage of the main battery 1 is changed in the vicinity of 4 V, the first detection signal can be stabilized more in comparison with the case where such changes are determined at the same voltage $(4+\Delta)$ V. Therefore, it is possible to suppress the wear of the auxiliary primary battery 2.

Likewise, a releasing voltage $(9+\alpha\Delta)$ V is set to be higher than a detection voltage $(9+\Delta)$ V in the second voltage detection circuit 34 by a predetermined margin $\Delta V$. Accordingly, even when the output voltage of the main battery 1 is changed in the vicinity of 9 V, the second detection signal can be stabilized more in comparison with the case where such changes are determined at the same voltage $(9+\Delta)$. Therefore, it is possible to suppress the wear of the auxiliary primary battery 2.

The second embodiment has been described by way of example, in which the margin voltage of the detection voltage with respect to the minimum operating voltage and the margin voltage of the releasing voltage with respect to the detection voltage are $\Delta V$ and $\alpha\Delta V$, respectively. However, the embodiment should not be limited to such.

Third Embodiment

FIG. 7 is a schematic diagram showing the configuration of an emergency call system for automobile according to the third embodiment of the invention. In the drawing, a reference numeral 42 denotes an accessory switch detection circuit for receiving the entry of the ON/OFF state of an accessory switch in the main key cylinder (not shown) of an automobile, and outputting a high-level accessory ON signal upon receiving the entry of an ON state; and 43 a second 2-input AND circuit inserted between a 2-input OR circuit 22 and third voltage dividing resistors 25 and 26, and adapted to output a high-level signal when a switching signal and an accessory ON signal are both high-level. Other components are similar to those of the second embodiment, and thus description thereof will be omitted.

Next, an operation will be described.

When the accessory switch in the main key cylinder of the automobile is changed to an ON state by a key operation, the accessory switch detection circuit 42 outputs a high-level accessory ON signal. When a high-level switching signal is outputted from the 2-input OR circuit 22 in this state, the output of the second 2-input AND circuit 43 is changed from a low level to a high level, and the npn transistor 23 is controlled to be set to an ON state.

Conversely, when the accessory switch is controlled to be OFF from the above state, alternatively for example the voltage of the main battery 1 is restored to change the switching signal to a low level, the npn transistor 23 is controlled to be set to an OFF state. Other operations are similar to those of the second embodiment, and thus description thereof will be omitted.

As described above, according to the third embodiment, the npn transistor 23 can be controlled to be ON based on the switching signal only in the ON-state period of the accessory switch. Thus, for example even when the main battery 1 dies due to the lighting of the head light during the engine stop, it is possible to prevent the auxiliary primary battery 2 from dying by controlling the accessory switch to be OFF.

Fourth Embodiment

Figure 8:
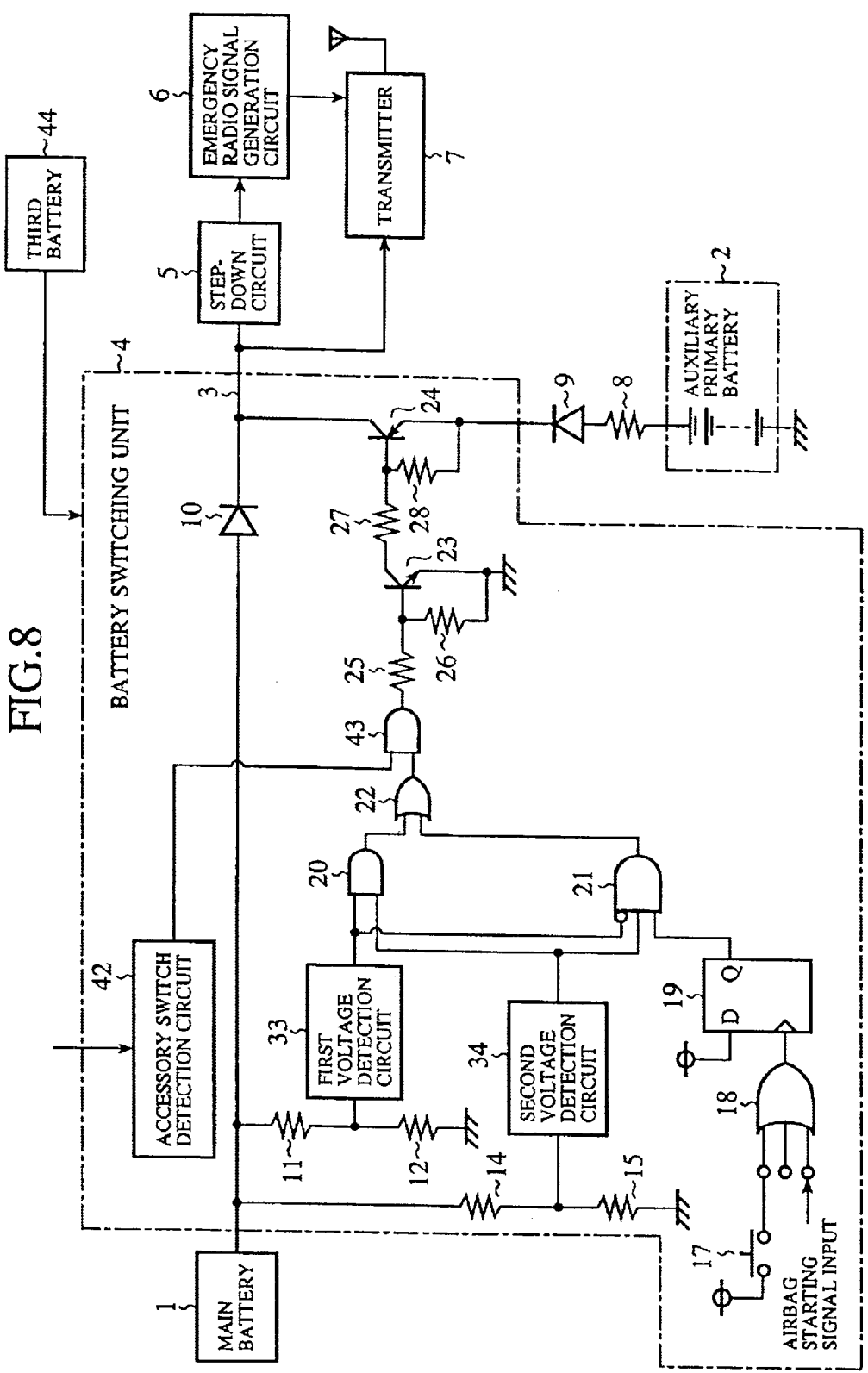
FIG. 8 is a schematic diagram showing the configuration of an emergency call system for automobile according to a fourth embodiment of the invention.

FIG. 8 is a schematic diagram showing the configuration of an emergency call system for automobile according to the fourth embodiment of the invention. In the drawing, a reference numeral 44 denotes a small-capacity third battery for supplying power only to a battery switching unit 4. Other components and operations are similar to those of the third embodiment, and thus description thereof will be omitted.

As described above, instead of the power of the main battery 1, the power of the third battery 44 is always supplied only to the battery switching unit 4. Thus, even when the output voltage of the main battery 1 is reduced to (4+Δ) V or lower, it is possible to switch to the auxiliary primary battery 2 by surely operating the battery switching unit 4. Moreover, since the battery switching unit 4 is operated by the third battery 44 instead of the auxiliary primary battery 2, the switching can be executed without wasting the power of the auxiliary primary battery 2 itself.

Industrial Applicability

As apparent from the foregoing, the battery switching device and the emergency call system of the present invention can be suitably used for transmitting an emergency radio signal in case of emergency by being loaded on a vehicle such as an automobile.

What is claimed is:

1. A battery switching device loaded on a vehicle and adapted to supply power from a main battery or an auxiliary primary battery of the vehicle to an emergency signal transmitter for transmitting an emergency radio signal, comprising:

a first voltage detection circuit for detecting whether or not an output voltage of the main battery is lower than a first detection voltage for making operable an emergency radio signal generation circuit of the emergency signal transmitter;

a second voltage detection circuit for detecting whether or not an output voltage of the main battery is lower than a second detection voltage for making operable a transmitter section of the emergency signal transmitter;

a manual switch for outputting an operation signal;

a trigger generation unit which outputs a trigger signal when the operation signal and/or an air bag starting signal is entered; and a switching determination circuit, to which output signals are entered from said first and second voltage detection circuits and said trigger generation unit, wherein said switching determination circuit always switches from the main battery to the auxiliary primary battery when an output voltage of the main battery lower than the first detection voltage, and switches from the main battery to the auxiliary primary battery only when a trigger signal is entered in a case in which an output voltage of the main battery is equal to or larger than the first detection voltage and lower than the second detection voltage.

2. A battery switching device according to claim 1, wherein said first voltage detection voltage circuit and/or said second voltage detection circuit determines whether or not an output voltage of the main battery is lower than each detection voltage by using the respective detection voltages, and determines whether or not an output voltage of the main battery is higher than the respective detection voltages by using each releasing voltage higher than the detection voltage.

3. A battery switching device according to claim 1, further comprising: an accessory switch detection circuit for detecting an operation state of an accessory switch of the vehicle, wherein said switching determination circuit executes switching to the auxiliary primary battery only when the accessory switch is being operated in said accessory switch detection circuit.

4. An emergency call system comprising:

a main battery;

an auxiliary primary battery;

an emergency signal transmitter including an emergency radio signal generation circuit for generating an emergency radio signal, and a transmitter section for transmitting the emergency radio signal by radio;

a first voltage detection circuit for detecting whether or not an output voltage of the main battery is lower than a first detection voltage for making operable an emergency radio signal generation circuit of the emergency signal transmitter;

a second voltage detection circuit for detecting whether or not an output voltage of the main battery is lower than a second detection voltage for making operable a transmitter section of the emergency signal transmitter;

a manual switch for outputting an operation signal;

a trigger generation unit for switching, which is made to output a trigger signal when the operation signal and/or an air bag starting signal is entered;

a switching determination circuit, to which output signals are entered from said first and second voltage detection circuits and said trigger generation unit, wherein said switching determination circuit always switches from the main battery to the auxiliary primary battery when an output voltage of the main battery lower than the first detection voltage, and switches from the main battery to the auxiliary primary battery only when a trigger signal is entered in a case in which an output voltage of the main battery is equal to or larger than the first detection voltage and lower than the second detection voltage; and a third battery for supplying power to said first and second voltage detection circuits, said manual switch, said trigger generation unit and said switching determination circuit.

5. A battery switching device loaded on a vehicle and adapted to supply power from a main battery or an auxiliary primary battery of the vehicle, comprising:

a first voltage detection circuit which detects whether or not an output voltage of the main battery is lower than a first detection voltage; and a second voltage detection circuit which detects whether or not an output voltage of the main battery is lower than a second detection voltage, wherein the second detection voltage is higher than the first detection voltage.

6. A battery switching device according to claim 5, further comprising:

a switching determination circuit which switches from the main battery to the auxiliary primary battery when an output voltage of the main battery is lower than the first detection voltage.

7. A battery switching device according to claim 6, wherein the switching determination circuit is operable to switch from the main battery to the auxiliary primary battery when the output voltage of the main battery is equal to or larger than the first detection voltage and lower than the second detection voltage.

8. A battery switching device according to claim 6, further comprising:

a manual switch which outputs an operation signal when the manual switch is closed; and a trigger generation unit which outputs a trigger signal when the operation signal and/or an air bag starting signal is received.

9. A battery switching device according to claim 8, wherein the switching determination circuit switches from the main battery to the auxiliary primary battery when the output voltage of the main battery is equal to or larger than the first detection voltage and lower than the second detection voltage and at least one of the manual switch is closed or the airbag starting signal has been transmitted.

10. A battery switching device according to claim 5, further comprising:

a manual switch which outputs an operation signal when the manual switch is closed; and a trigger generation unit which outputs a trigger signal when the operation signal and/or an air bag starting signal is received.

11. A battery switching device according to claim 5, wherein the first voltage detection voltage circuit and/or the second voltage detection circuit determines whether or not an output voltage of the main battery is lower than each detection voltage by using the respective detection voltages, and determines whether or not an output voltage of the main battery is higher than the respective detection voltages by using each releasing voltage higher than the detection voltage.

12. A battery switching device according to claim 5, further comprising:

an accessory switch detection circuit which detects an operation state of an accessory switch of the vehicle; and a switching determination circuit which prevents switching from the main battery to the auxiliary primary battery when the accessory switch is not being operated.

* * * * *

UNITED STATES PATENT AND TRADEMARK OFFICE
CERTIFICATE OF CORRECTION

PATENT NO.   : 6,661,116 B1
DATED        : December 9, 2003
INVENTOR(S)  : Hitoshi Seto It is certified that error appears in the above-identified patent and that said Letters Patent is hereby corrected as shown below:

Column 3,
Line 50, delete "tiling" and insert -- timing --.

Signed and Sealed this

Fifth Day of October, 2004

JON W. DUDAS
*Director of the United States Patent and Trademark Office*